United States Patent [19]

Hovis et al.

[11] Patent Number: 5,368,472
[45] Date of Patent: Nov. 29, 1994

[54] LOW NOX BURNER

[75] Inventors: James E. Hovis; Harry P. Finke, both of Allegheny County, Pa.

[73] Assignee: Bloom Engineering Company, Inc., Pittsburgh, Pa.

[21] Appl. No.: 1,584

[22] Filed: Jan. 6, 1993

Related U.S. Application Data

[60] Continuation of Ser. No. 681,441, Apr. 3, 1991, Pat. No. 5,180,300, which is a continuation of Ser. No. 469,075, Jan. 19, 1990, abandoned, which is a division of Ser. No. 168,892, May 16, 1988, Pat. No. 4,983,118.

[51] Int. Cl.$^5$ .............................. F87D 17/00
[52] U.S. Cl. ........................ 431/115; 431/116; 431/180; 431/187; 431/215
[58] Field of Search ............... 431/215, 8, 9, 10, 353, 431/354, 350, 116, 115

[56] References Cited

U.S. PATENT DOCUMENTS

| | | | |
|---|---|---|---|
| 738,537 | 9/1903 | Gwynn | 431/354 |
| 973,040 | 10/1910 | Hawk | 431/354 |
| 1,079,642 | 11/1913 | Egler | 431/115 |
| 1,279,697 | 9/1918 | Hook | 432/181 |
| 2,515,845 | 7/1950 | Van Den Bossche | 431/115 |
| 2,701,608 | 2/1955 | Johnson | 431/353 X |
| 2,925,858 | 2/1960 | Reed | 431/115 |
| 3,209,811 | 10/1965 | Strang . | |
| 3,342,241 | 9/1967 | Whitesides | 431/353 X |
| 3,676,060 | 7/1972 | Bedetti | 431/9 |
| 3,852,020 | 12/1974 | Peczeli et al. | 431/9 |
| 3,990,831 | 11/1976 | Syska | 431/9 |
| 4,060,379 | 11/1977 | LaHaye et al. | 431/116 X |
| 4,328,020 | 5/1982 | Hughes | 432/181 |
| 4,358,268 | 11/1982 | Neville | 431/215 |
| 4,439,137 | 3/1984 | Suzuki et al. | 431/8 |
| 4,445,842 | 5/1984 | Syska | 431/115 |
| 4,453,913 | 6/1984 | Gitman | 431/8 |
| 4,496,306 | 1/1985 | Okigami et al. | 431/8 |
| 4,515,553 | 5/1985 | Morimoto et al. | 431/8 |
| 4,522,588 | 6/1985 | Todd et al. | 432/219 |
| 4,604,051 | 8/1986 | Davies et al. | 432/181 |
| 4,730,599 | 3/1988 | Kendall et al. | 431/215 |
| 4,828,483 | 5/1989 | Finke | 431/215 |

FOREIGN PATENT DOCUMENTS

| | | | |
|---|---|---|---|
| 0264127 | 1/1989 | Germany | 431/354 |
| 51-113830 | 9/1976 | Japan | F23C 11/00 |
| 54-442332 | 4/1979 | Japan | F23C 11/00 |
| 54-105328 | 8/1979 | Japan | F23C 11/00 |
| 62-142644 | 9/1987 | Japan | F23L 15/00 |
| 62-276308 | 12/1987 | Japan | F23C 11/00 |
| 0989237 | 1/1983 | U.S.S.R. | 431/354 |

Primary Examiner—Carl D. Price
Attorney, Agent, or Firm—Webb Ziesenheim Bruening Logsdon Orkin & Hanson

[57] ABSTRACT

A regenerative burner having heat storage units with combustion effluent/combustion air ducts therethrough, fuel intake means and a burner body, wherein the burner is designed to suppress NOx formation and to control flame shape and characteristic in the regenerative system during combustion. The regenerative burner may include a burner baffle, or may include a plurality of gas jets entrained in generally converging fashion for control of the flame charactaristics and shape dispositive of NOx formation. The burner may provide for staged combustion, either by means of sequential fuel injection or sequential provision of combustion air, or the burner may depress NOx formation by vitiation of combustion air with products of combustion. The present regenerative burners suppress NOx formation yet preserve the remaining characteristic features of regenerative systems.

6 Claims, 6 Drawing Sheets

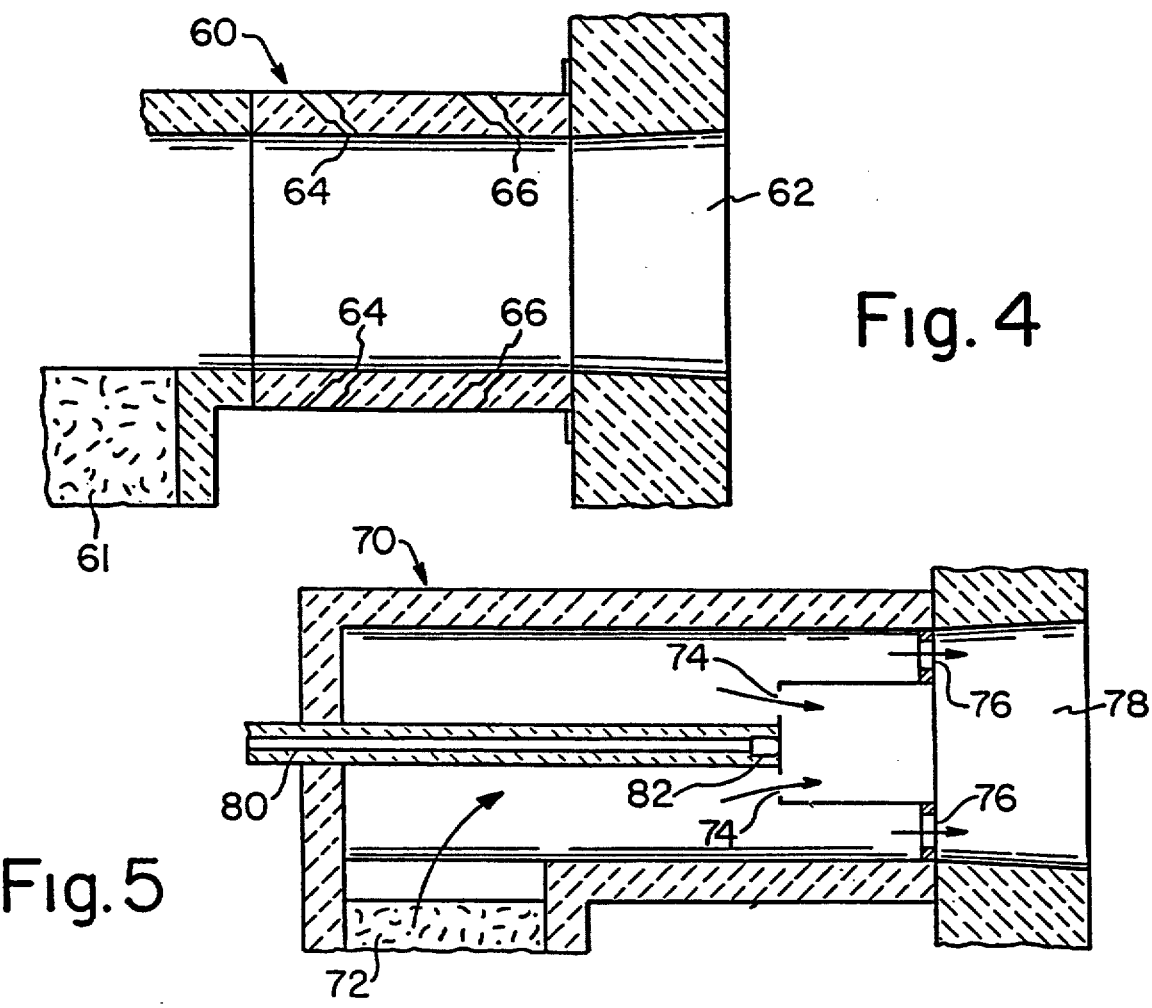

LOW NOX BURNER

This application is a continuation of application Ser. No. 07/681,441 filed Apr. 3, 1991 (now U.S. Pat. No. 5,180,300), which is a continuation of application Ser. No. 07/469,075 filed Jan. 19, 1990 (now abandoned), which is a divisional of application Ser. No. 07/168,892 filed Mar. 16,1988 (now U.S. Pat. No. 4,983,118).

FIELD OF THE INVENTION

The invention relates to regenerative type burners, for heating a furnace, with minimized NOx formation in the ultimate combustion effluents,

INTRODUCTION

Regenerative-type burners for furnaces are well-known in the art in varied forms and designs, but they share the common feature whereby heat storage units are provided to trap and store heat from combustion effluents, with subsequent transfer of the heat to preheat combustion air. The earliest regenerative-type furnaces were symmetrical arrangements having both burner(s) and heat storage units (often solid structural arrays of "checker chamber" bricks) in place on each of two sides of the furnace. Firing of such a regenerative furnace began with the burner(s) on one side, with concomitant storage of the heat present in the combustion effluents by the heat storage units on the second side. After optimal heating of the heat storage units, or the "checker chamber," the air flow in the furnace was reversed to draw combustion air in through the checker chamber, thus preheating the combustion air. Ducts in the checker chamber thus alternately conveyed combustion products and combustion air, and the burners functioned alternately as burners and as flues.

Modern regenerative systems do not involve complete symmetrical furnaces but instead include specialized regenerative burners employed, typically, in pairs. Each of the paired regenerative burners is equipped with heat storage units, ordinarily in the form of compact regenerative beds, through which combustion air passes en route to the burner. Because the burners are employed in pairs, one burner is fired at a time while the other functions as a flue and heat storage bed. Then, every 20-120 seconds or so, flow in the furnace is reversed and the burners "exchange" functions: the first-fired burner becomes the flue/heat storage bed as the second burner fires. A system exemplary of one paired burner arrangement is found in U.S. Pat. No. 4,522,588.

A persistent problem with regenerative systems involves the extremely high NOx concentrations inevitably present in the combustion effluents, produced as a result of the extremely high air preheats and flame temperatures, as well as through fuel bound nitrogen. As a result, regenerative systems which historically enjoyed industry-wide acceptance now cannot meet the ecology standards in an ever-increasing number of countries and/or process conditions. Additionally, the burners used with prior art "regenerator pairs" are of a fixed design and are not adaptable to control flame shape or characteristic. There is a need for low NOx burner concepts which can be broadly adapted to the specific applications by altering the flame shape or characteristic to meet the exact requirement. A need therefore persists for regenerative burner systems which provide the heat-regenerative function of prior art systems yet provide for significant NOx reduction and application adaptability as well.

SUMMARY OF THE INVENTION

In order to meet this need, the present invention is a regenerative burner having fuel delivery means, a burner body and a regenerative bed connected to a combustion air/exhaust passage, wherein the burner is designed to suppress NOx formation in the regenerative system during combustion and can readily be arranged to control the flame shape and characteristic. NOx can be substantially reduced by incorporating in the burner design a suitable baffle or, more broadly, means to induce recirculation of combustion gases back into the primary combustion zone, by staging the fuel through sequential fuel injection, by staging the combustion air through sequential introduction of that air or through the use of vitiated combustion air where products of combustion are mixed with the combustion air on a controlled basis to reduce the oxygen content of the air, either by mixing flue gas into the combustion air at the fan inlet or within the burner structure itself.

The regenerative burner may, therefore, include a burner baffle with air jets or may include a plurality of gas jets, in such a manner that the jets induce recirculation of combustion gases back into the primary combustion zone to suppress NOx and also act to control the fuel/air mixing rates which establish flame shape and characteristic. The burner may provide staged combustion, either gas or air, or may suppress NOx through vitiating the air within the burner or through the use of vitiated air from the combustion fan. Certain embodiments of the present regenerative burner may include combustion gas recirculation back into the primary combustion zone, the use of vitiated air and either fuel or combustion air staging. The present regenerative burners reduce NOx, control the flame shape and characteristic, yet preserve the high thermal efficiency characteristics of the regenerative systems.

BRIEF DESCRIPTION OF THE DRAWINGS

FIGS. 4 and 5 are sectional views of two regenerative burners (third and fourth embodiments) adapted for staged combustion;

DETAILED DESCRIPTION OF THE INVENTION

Figure 1:
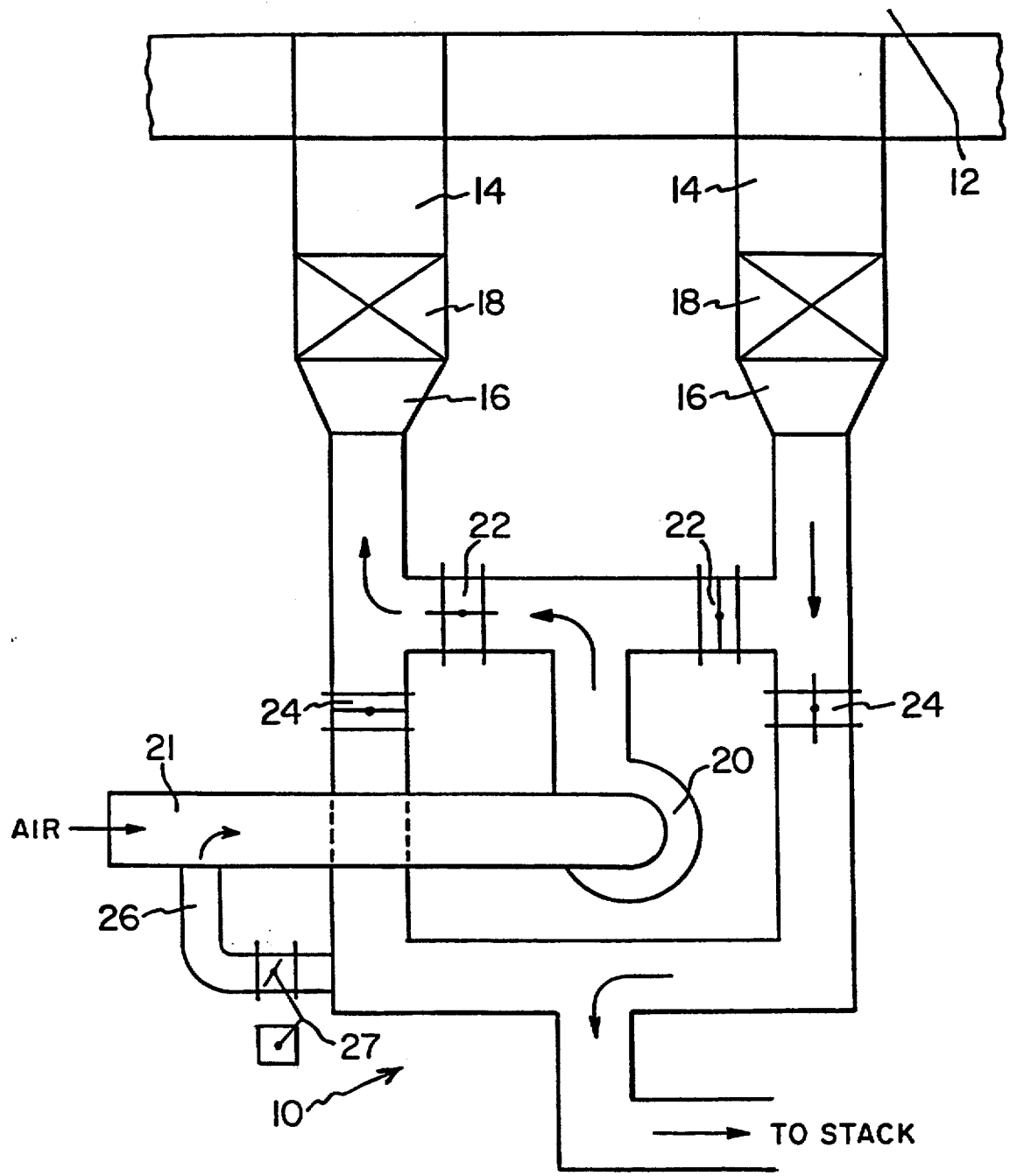
FIG. 1 is a schematic view of a furnace and two low NOx regenerative burners, also showing the method of vitiating the air at the fan inlet.

The embodiments of the invention are best considered first in context, with initial reference being to the schematic diagram of FIG. 1. In FIG. 1, a regenerative system 10 is illustrated in which a furnace chamber 12 is equipped with a pair of regenerative burners 14 as shown. Each regenerative burner 14 is connected to an immediately adjacent regenerative bed 18, through which combustion air/exhaust pass between the burner 14 and the combustion air/exhaust passage 16. Combustion air is provided to one burner 14 at a time by action of the combustion blower 20, so that when the left burner 14 (shown in FIG. 1) is firing, the left combustion air valve 22 is open and the left exhaust valve 24 is closed, with the right combustion air valve 22 and right exhaust valve 24 closed and open, respectively, to enable the right burner 14 to function as a flue for the furnace chamber 12. As a result, when the left burner 14 fires, the regenerative bed 18 of the right burner 14 collects heat from the combustion effluents. When flow in the furnace is reversed, the right regenerative bed 18 preheats combustion air for the left regenerative burner 14. Connection 26 shown with the control valve 27 provides the means for vitiating the air with products of combustion at the fan inlet 21.

Figure 2:
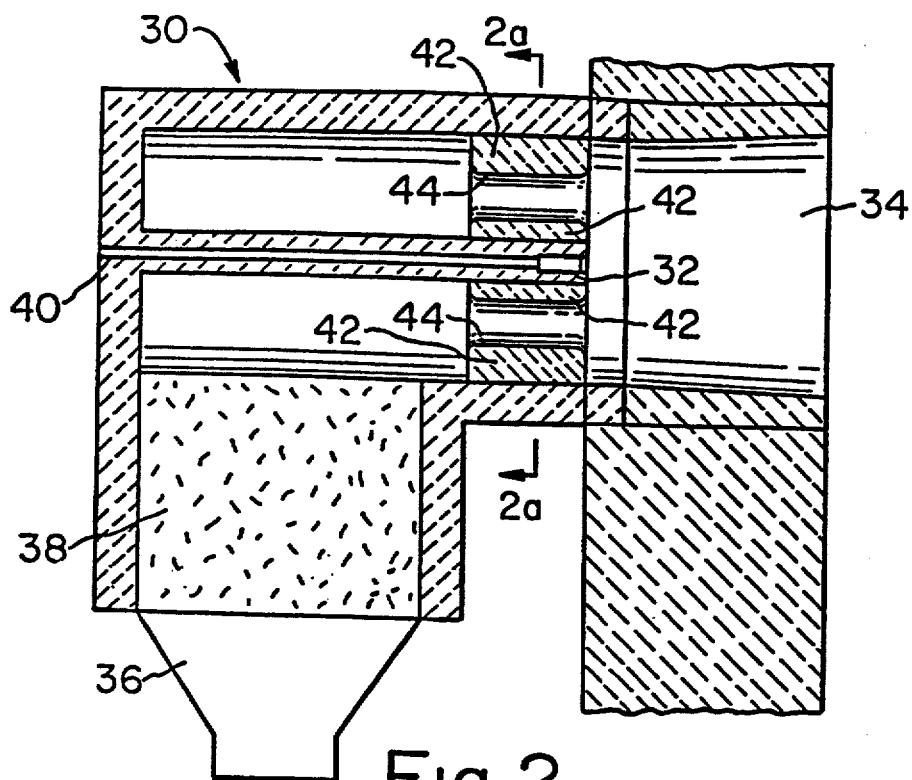
FIG. 2 is a sectional view of a first embodiment of a low NOx regenerative burner having a burner baffle.

Referring now to FIG. 2, the regenerative burner as illustrated includes a burner 30, from which a fuel nozzle 32 (embedded in refractory) fuels combustion in the port 34. Alternatively, the fuel nozzle may be insulated or air cooled by other means known in the art. A pair of burners (only one shown) provide combustion for an adjacent furnace chamber as shown in FIG. 1 and as known in the art. Combustion air is provided to the burner 30 via air uptake 36, which passes through the regenerative bed 38 as shown. The fuel nozzle 32 is supplied by a fuel line 40. Disposed adjacent the fuel nozzle 32 is a burner baffle 42, which channels the flow of combustion air into the port 34.

Figure 2A:
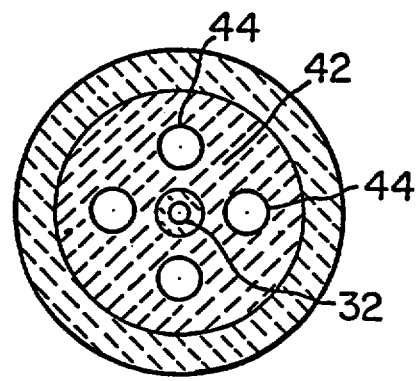
FIG. 2a is a section taken along lines 2a—2a of FIG. 2.

The structure of the burner baffle 42 is more readily seen in FIG. 2a, which is a section taken along line 2a—2a of FIG. 2. The burner baffle 42 is a generally cylindrically shaped structure having four burner baffle apertures 44 therein, spaced as shown. (In FIG. 1, the burner baffle apertures 44 are shown above and below the nozzle end of the fuel line 40: the exit of each aperture 44 is coplanar with the tip of the fuel nozzle 32.) As shown in FIG. 2a, air passage is prevented except through the burner baffle apertures 44. The jet effect of the combustion air introduced through the four apertures immediately upstream of the fuel nozzle 32 creates a low pressure region at the baffle face which induces recirculation of combustion gases back into the primary combustion zone, thus lowering the flame temperature and substantially reducing NOx levels in the combustion effluents of the burner. The use of four apertures, spaced as shown, provides adequate recirculation regions for the combustion gases between the holes. The same combustion air jet action induces fuel flow to the combustion air, providing the required mixing of fuel and air which strongly influences flame shape and characteristic. The angularity and direction of the combustion air holes can be adjusted to control flame shape and characteristic. Although the four-hole burner baffle 42 is preferred from the standpoint of minimized NOx, the number and arrangement of the combustion air holes can be varied as required and incorporated into the regenerative burner 30 of FIG. 2.

Dimensions for the burner baffles 42 will vary, but an exemplary baffle is 6½ inches in outer diameter, with proportionally sized apertures as shown. Baffle diameters commonly range between 5 and 30 inches. Although the four-hole burner baffle 42 is preferred, as the baffle which maximizes NOx reduction, 6-, 8-, 9- and 12-hole baffles also reduce NOx and may therefore also be incorporated into the regenerative burner 30 of FIG. 2.

Referring once again to FIG. 2, and as applies to all other embodiments of the invention, the burner 30 is constructed of a fabricated metal outer casing (not shown) and is fully insulated with a suitable insulating material. The fuel lines and nozzles are fabricated of standard materials including metals, and such metal structures are either adequately insulated or air cooled when fully exposed (see FIGS. 2 and 5) or are embedded in or shielded with refractory in other embodiments. Materials suitable for use in the fabrication of the regenerative bed 38 are known in the art.

Figure 3:
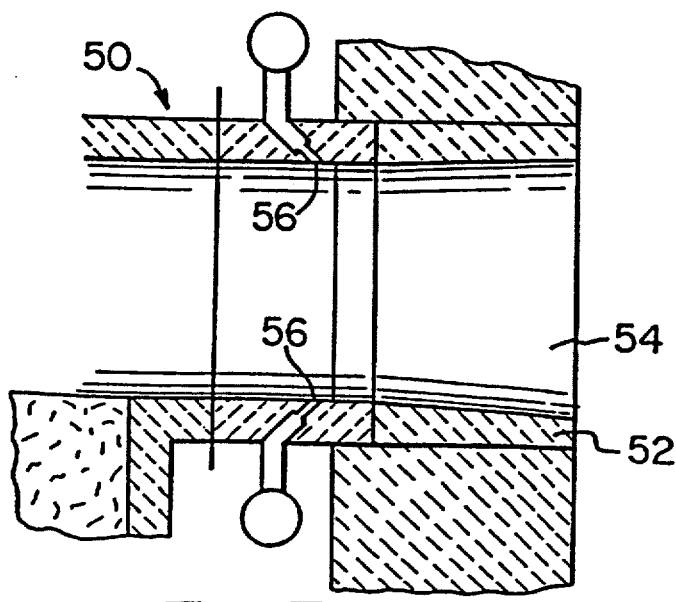
FIG. 3 is a sectional view of a second embodiment of a regenerative burner having fuel injection nozzles for combustion air and combustion gas entrainment.

The second embodiment of the present low NOx regenerative burner is illustrated in FIG. 3. FIG. 3 is a partial illustration of a burner 50 having a port block 52 and a port 54. The air uptake and heat storage bed are identical to those of the first embodiment of the invention, and these structures therefore do not appear in detail in FIG. 3. Combustion is fueled by fuel apertures 56, which inject the fuel into the port 54 in the angled fashion as shown. (As an alternative to fuel apertures in the surrounding refractory, conventional fuel lines and nozzles may be used.) Although two fuel apertures 56 are shown in FIG. 3, additional fuel apertures may be provided in an evenly-spaced, concentric planar arrangement including 4, 6, 8 or 10 fuel apertures, for example. The forward angled fuel apertures function to induce recirculation of combustion gases back to the primary combustion zone, depressing NOx. The fuel jets also entrain combustion air promoting the mixing of fuel and air and affecting flame shape and characteristic. The design can be altered with respect to the angularity and direction of the individual fuel jets to vary the flame shape and characteristic to suit specific requirements. The number and arrangements of the-jets (angularity to the centerline of the burner and spin angle) can be varied to control the degree of NOx suppression as well as flame shape and characteristic. The multiple jet arrangement shown, used in conjunction with individual automated shut-off valves between the supply manifold and each jet, offers the additional advantage of the ability to reduce the number of jets as fuel demand reduces in order to maintain entrainment energy and mixing energy. For example, a 6 jet arrangement would permit shut off of two jets at ⅔ flow and four jets at ⅓ flow maintaining maximum jet energy on the remaining active jets. Although opposite fuel apertures 56 as shown in FIG. 3 inject the fuel at relative 90° angles, injection may be effected at relative angles between about 30° and about 150° related to the centerline of the burner and also could be provided with spin action through the use of a second angle to the injection point.

FIGS. 4 and 5 illustrate third and fourth embodiments of the present low NOx regenerative burners in which combustion is staged. Staged fuel accomplishes staged combustion in the burner of FIG. 4; staged air effects staged combustion in the burner of FIG. 5. Referring first to FIG. 4, the burner 60, having a regenerative bed 61 and a port 62, includes first stage fuel apertures 64 and second stage fuel apertures 66. The fuel supply to the first stage fuel apertures 64 is limited so that between 30-70% of the fuel is injected by the first stage fuel apertures 64. Second stage fuel apertures 66, positioned between the first stage fuel apertures 64 and the port 62, inject the balance of the fuel (30-70%) into the combustion site. Combustion air for the staged combustion enters via the regenerative bed 61. This two-stage arrangement functions to reduce NOx formation not only as a result of the combustion gas and combustion air entrainment induced by the paired apertures 64 and 66, but also as a result of the presence of considerable excess air at the site of the first stage of combustion, which reduces the temperature in the primary combustion zone and suppresses NOx formation. Although two sets of two fuel apertures each are shown for the purpose of this third embodiment of the invention, more than two fuel nozzles at each of the two stages of combustion may be used, preferably in an evenly-spaced, planar concentric configuration. As with the other embodiments of the present invention, the burner 60 is adapted to function, when the flow in the furnace is reversed, as a flue.

Referring now to FIG. 5, the burner which effects staged combustion with staged combustion air is illustrated in pertinent part. The burner 70 having a regenerative bed 72 has a fuel line 80, fuel nozzle 82 (both embedded in refractory or otherwise insulated or cooled) and a port 78. Combustion air entering the burner 70 via the regenerative bed 72 mixes with fuel in two stages by means of the primary air passages 74 and the secondary air passages 76. Primary and secondary combustion are accomplished by initial provision, through primary air passages 74, of only 30-70% of the combustion air at the site of the fuel nozzle 82. The remaining 30-70% of the combustion air travels via secondary air passages 76 to effect secondary combustion in the port 78. This staged air combustion device operates fuel rich in the primary combustion zone, reducing flame temperature and thus suppressing NOx formation. A preferred construction would be that the air staging structure would be constructed of suitable ceramic material, due to the elevated temperature to which it is exposed. The arrangement of the air apertures 76, could be adjusted as to the number of holes, length of holes, direction and spin angle to provide minimum NOx and control of flame shape and characteristic. It is to be noted that despite the relatively more restricted air flow through primary and secondary air passages 74 and 76, as compared with the air flow structures illustrated in FIG. 4, both embodiments of the invention are suitable for-use in regenerative systems and both burners can function as flues when the direction of the flow in the furnace is reversed. Vitiated air provided by the method shown on FIG. 1 at the fan inlet can be applied to the embodiments described in FIG. 2, FIG. 3, FIG. 4, and FIG. 5 and this will further suppress NOx substantially below the levels possible with these embodiments alone.

Figure 6:
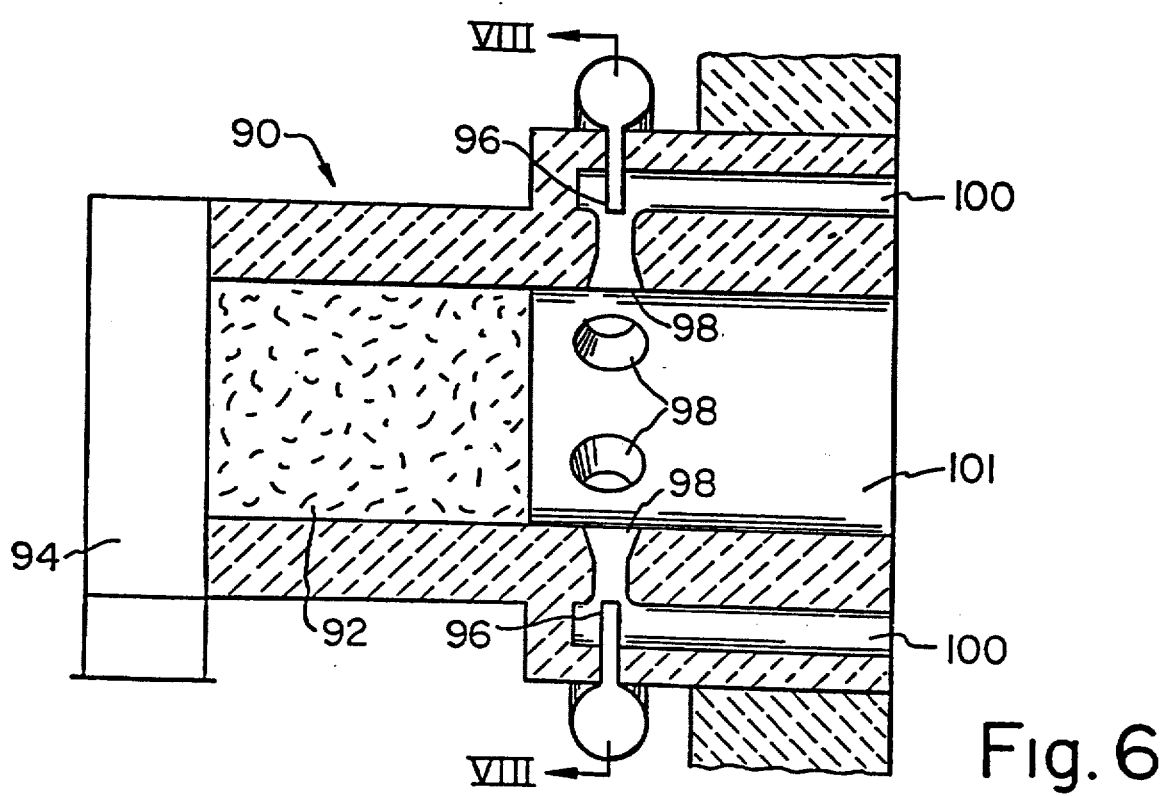
FIG. 6 is a sectional view of a fifth embodiment of a regenerative burner in which combustion air is vitiated with products of combustion.

FIGS. 6 through 10 (and also FIG. 1) illustrate various ways to depress NOx formation by using vitiation of combustion air with products of combustion. Referring now to FIG. 6, the fifth embodiment of the invention is illustrated in which a burner 90, having an air intake 94 and a regenerative bed 92, is fitted with six converging fuel lines 96, six venturies 98, and six vitiation ducts 100. The burner 90 leads to a furnace chamber via a port 101.

By a total of 6 converging fuel lines, therefore, fuel is provided to the burner via its respective venturies 98 within the burner refractory. (For the purpose of the present invention, a venturi is a hollow area having flared cylindrical shape.) The injection of the high pressure fuel from the fuel lines 96 generates a negative pressure region in the venturies 98, which negative pressure region induces furnace gases back from the furnace chamber through the vitiation ducts 100 to the site of combustion. Recirculation of products of combustion in this manner cools the flame and reduces NOx formation during combustion. If necessary, during the off cycle when no fuel gas is passing through the fuel lines 96, a small quantity of combustion air and/or recirculated products of combustion can be passed into the burner 90 to maintain cooling and to prevent cracking of any stagnant gaseous hydrocarbons present. The burner 90 functions efficiently, in reverse, as a flue.

Although not illustrated in FIG. 6, optionally the vitiation ducts 100, the venturies 98 or the converging fuel lines 96 may be angled forward or backward or with a tangential component to generate a hyperboloid stream of fuel and induced products of combustion. The angles and spiral components are specifically designed to suit different applications. These variations may be employed to alter the flame shape and geometry to suit a specific application. These options may also be exercised with respect to FIGS. 2, 3, 7, 9 and 10 herein.

Figure 8:
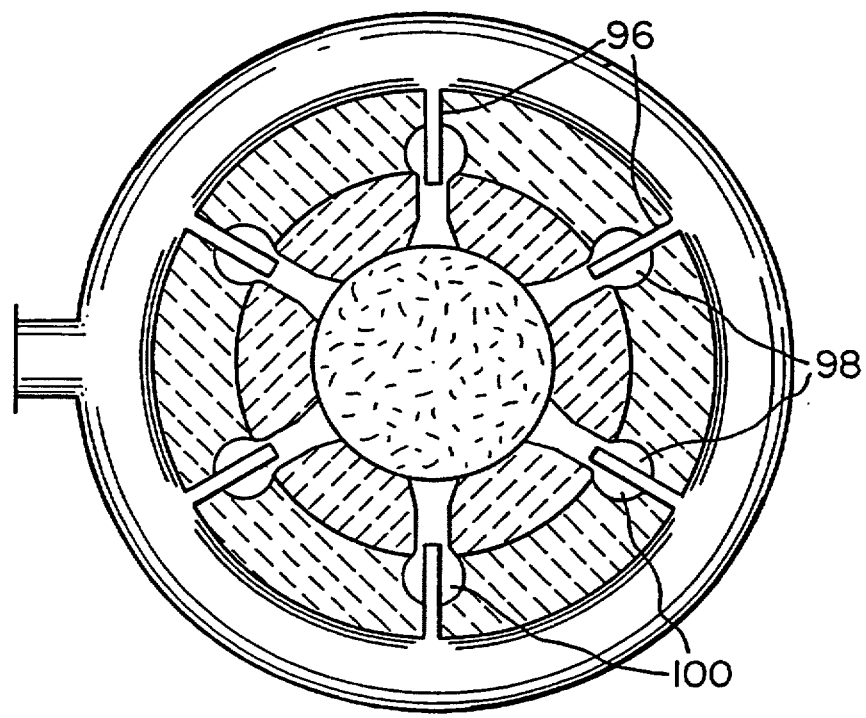
FIG. 8 is a sectional view taken along lines VIII—VIII of FIG. 6.

FIG. 8 is a sectional view taken along line VIII—VIII of FIG. 6. The six evenly-spaced converging fuel lines 96 and their respective venturies 98 can be readily seen in their "planar concentric" configuration.

Figure 7:
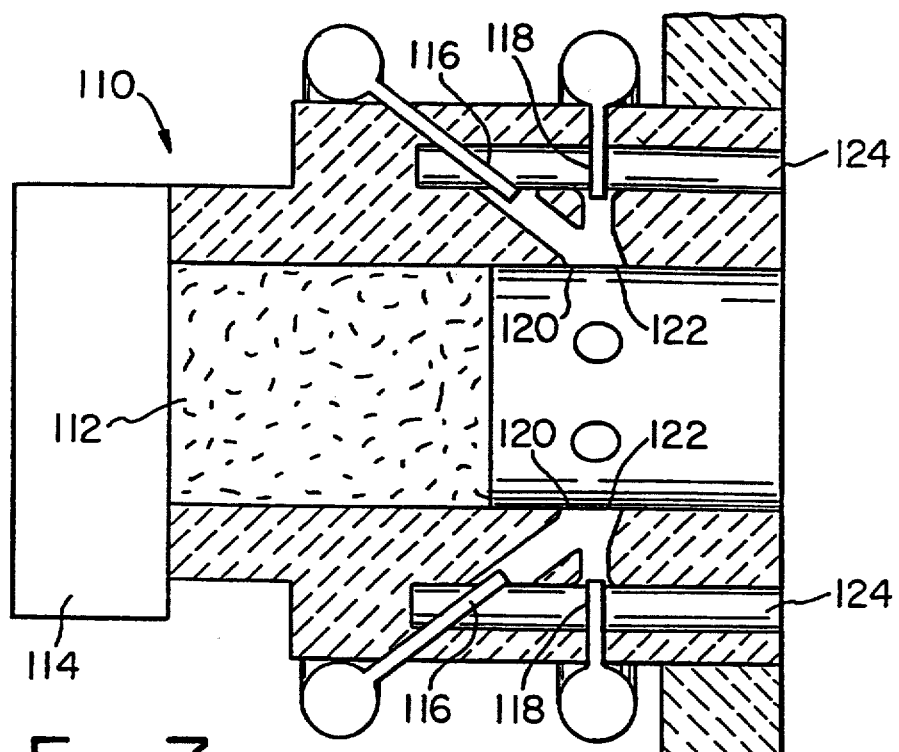
FIGS. 7 and 9 are sectional views of a sixth and seventh embodiment of a regenerative burner having pairs of converging nozzles.
Figure 9:
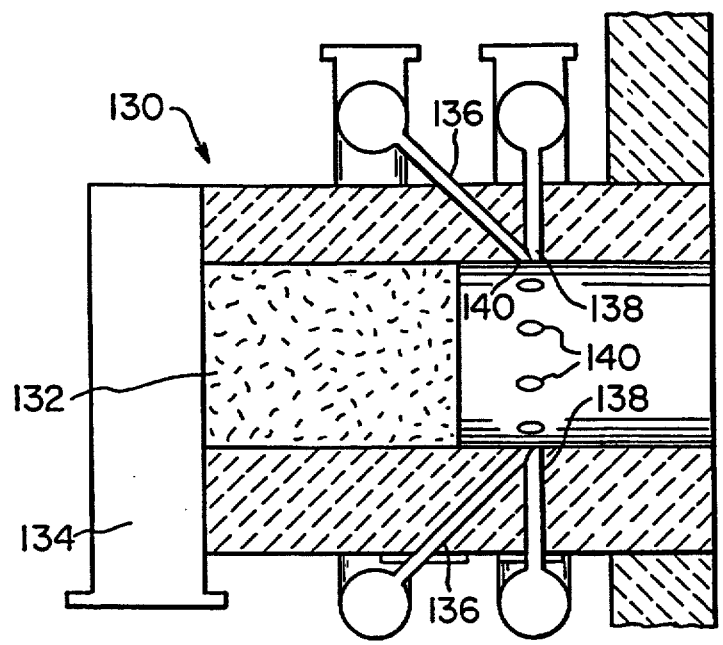
Figure 10:
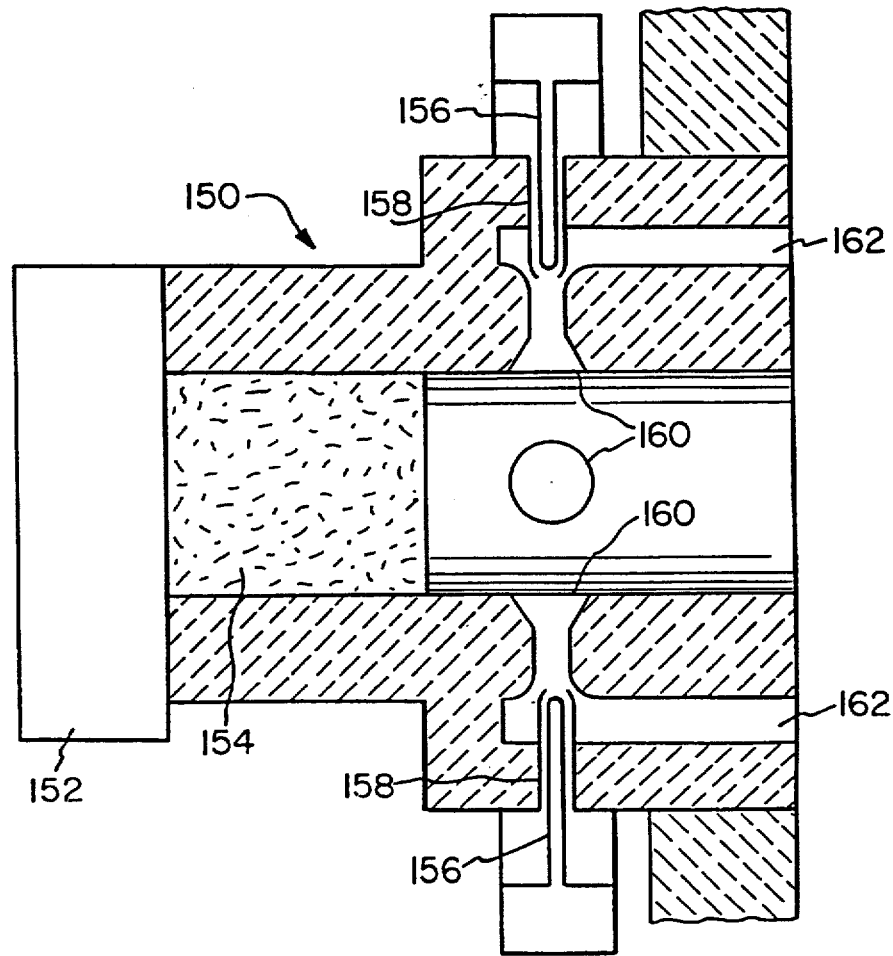
FIG. 10 is a sectional view of an eighth embodiment of a regenerative burner in which first and second concentric streams (fuel/fuel, fuel/air, fuel/products of combustion) are introduced into the combustion site.

FIGS. 7, 9 and 10 illustrate additional embodiments whereby products of combustion are recirculated for NOx suppression. FIG. 7 illustrates a burner 110 having an air intake 114 in series with the regenerative bed 112. The burner 110 incorporates venturies 120, 122 and vitiation ducts 124 similar to those of the previous embodiment, but supplements these structures with the first and second converging fuel lines 116, 118 as shown. The first converging fuel lines 116 are disposed within first venturies 120 and the second converging fuel lines 118 are disposed within the second venturies 122 to create multiple converging fuel streams; the pressure phenomena (negative pressure region) generated by the fuel streams within the respective venturies function to induce products of combustion back through the vitiation ducts 124 as effected by the previous embodiment of the invention. Additionally, fuel may be staged between the first converging fuel lines 116 and the second converging fuel lines 118 for further control of flame shape and characteristics. Recirculation of products of combustion into the burner contributes to NOx minimization. More particularly, the collision of the streams along with the variance in the staging of the fuel—and commensurate recirculation of products of combustion—creates turbulence levels which can adjustably determine flame geometry.

FIG. 9 illustrates a sixth embodiment of the invention similar to the embodiment illustrated in FIG. 7. A burner 130 includes an air intake 134 in series with a regenerative bed 132. Combustion is effected by means of first converging fuel lines 136 and second converging fuel lines 138. Each set of immediately adjacent first and second converging fuel lines 136, 138 converges the fuel at a relative angle greater than 30°, such as the relative 45° angle as shown. The collision of the injected fuel, along with variance in the quantity of fuel exiting each nozzle, creates turbulence levels which can adjustably determine flame geometry. The convergence chamber 140 does not itself induce recirculation of products of combustion; for the purpose of this sixth embodiment of the invention, combustion air via air intake 134 is vitiated with products of combustion recirculated via appropriate fluid-channeling means (not shown), including but not limited to the recirculation means illustrated schematically in FIG. 1 herein or, alternatively as disclosed in U.S. patent application Ser. No. 025,365 to Finke, entitled "LOW NOX Radiant Tube Burner and Method," incorporated herein by reference.

Referring now to FIG. 10, combustion air entering the burner 150 first passes through the regenerative bed 154 in series with the air intake 152 as shown. The linear fuel lines 156 are each paired with coaxial annular fuel lines 158. (Annular fuel lines 158 may have a perforate annular nozzle, not shown, if desired.) Each pair of combined coaxial fuel lines, which yield coaxial streams, lead into the respective ventures 160. Although the coaxial fuel lines may obviously create a coaxial fuel/fuel stream, fuel/air and fuel/products of combustion streams are also contemplated within the scope of the present invention. The coaxial streams create a negative pressure region in the venturi 160 which in turn induces recirculation of products of combustion from the furnace through the vitiation ducts 162. For the purpose of this eighth embodiment of the invention, the fluid exiting the annular fuel line 158 is most preferably a low pressure cold air having an energy source therein, which would provide a cooling media to the linear fuel line 156 to promote structural stability thereof. (Low pressure cold air energy sources may also be used in the other embodiments of the present invention where appropriate.) As with the previously described embodiments of the invention, recirculation of products of combustion depresses NOx formation.

In all embodiments of the invention disclosed herein, a plurality of fuel nozzles in the disclosed positions may be provided, preferably in radial configuration. Moreover, convergence and/or entrainment of the fuel exiting the fuel nozzles may be accomplished with convergence angles of the fuel nozzles between 30° and about 150°, generally.

Typical fuels for use in these regenerative systems include gas and oil. Refractory materials are well known in the art and are generally ceramic compositions prepared to specifications required for particular process applications.

Although the invention has been described in connection with specific materials and specific embodiments, the invention is to be limited only insofar as is set forth in the accompanying claims.

I claim:
1. A burner for heating a furnace chamber, comprising:
   a burner body having a central chamber in fluid communication with said furnace chamber;
   means for directing combustion air through said burner body and said central chamber, said combustion air directing means comprising a blower and a duct in fluid communication with said blower;
   said burner body having means for vitiating combustion air with products of combustion from said furnace chamber, said combustion air vitiating means including at least four fuel nozzles in said burner body, each of two of said fuel nozzles being disposed within a first venturi leading from said fuel nozzle to said central chamber of said burner, with each of the remaining two of said fuel nozzles being disposed within a second venturi leading from said fuel nozzle to said central chamber, each of said first venturis converging with each of said second venturis and each of said first and second venturis being in fluid communication with said furnace chamber via a vitiation duct therebetween.

2. A burner for heating a furnace chamber, comprising:
   a burner body having a central chamber in fluid communication with said furnace chamber;
   means for directing combustion air through said burner body and said central chamber, said combustion air directing means comprising a blower and a duct in fluid communication with said blower;
   said burner body having means for vitiating combustion air with products of combustion from said furnace chamber, said combustion air vitiating means including
   (i) at least one venturi in fluid communication with said central chamber,
   (ii) at least one fuel nozzle in said burner body, said fuel nozzle being disposed within said venturi, and
   (iii) a vitiation duct in fluid communication with said furnace chamber and said venturi, and
   wherein said fuel nozzle includes a linear fuel line coaxial with an annular fuel line.

3. A burner for heating a furnace chamber, comprising:
   a burner body having a central chamber in fluid communication with said furnace chamber;
   means for directing combustion air through said burner body and said central chamber, said combustion air directing means comprising a blower and a duct in fluid communication with said blower;
   said burner body having means for generating a negative pressure to draw products of combustion from said furnace chamber back to said burner body for vitiating combustion air, said negative pressure generating means comprising at least four fuel nozzles, each of two of said fuel nozzles being disposed within a first venturi leading from said fuel nozzle to said central chamber of said burner, with each of the two remaining of said fuel nozzles being disposed within a second venturi leading from said fuel nozzle to said central chamber, each of said first venturis converging with each of said second venturis and each of said first and second venturis being in fluid communication with said furnace chamber via a vitiation duct therebetween.

4. A burner for heating a furnace chamber, comprising:
   a burner body having a central chamber in fluid communication with said furnace chamber:
   means for directing combustion air through said burner body and said central chamber, said combustion air directing means comprising a blower and a duct in fluid communication with said blower;
   said burner body having means for vitiating combustion air with products of combustion from said furnace chamber, said combustion air vitiating means including
(i) at least one venturi in fluid communication with said central chamber,
(ii) a plurality of fuel nozzles in said burner body, each said fuel nozzle being disposed within one said venturi, and
(iii) at least one vitiation duct with each said vitiation duct in fluid communication with said furnace chamber and one said venturi.

5. A burner for heating a furnace Chamber, comprising:
a burner body having a central chamber in fluid communication with said furnace chamber;
means for directing combustion air through said burner body and said central chamber, said combustion air directing means comprising a blower and a duct in fluid communication with said blower:
said burner body having means for vitiating combustion air with products of combustion from said furnace chamber, said combustion air vitiating means including
(i) at least one venturi in fluid communication with said central chamber,
(ii) at least four fuel nozzles, each of two of said fuel nozzles being disposed within a first venturi leading from said fuel nozzle to said central chamber of said burner, with each of the remaining of two of said fuel nozzles being disposed within a second venturi leading from said fuel nozzle to said central chamber of said burner, each of said first venturis converging with each of said second venturis, and
(iii) each of said first and second venturis being in fluid communication with said furnace chamber via a vitiation duct therebetween.

6. A burner for heating a furnace chamber, comprising:
a burner body in fluid communication with said furnace chamber;
means for directing combustion air through said burner body, said means comprising a blower and a duct in fluid communication with said blower;
said burner body having a first set of a plurality of fuel nozzles upstream from a second set of a plurality of fuel nozzles;
whereby combustion occurs in stages with primary combustion occurring in the area of said first set of fuel nozzles and secondary combustion occurring in the area of said second set of fuel nozzles; and
wherein said first set of a plurality of fuel nozzles is supplied to deliver 30–70% of a combustion fuel to said site of said primary combustion, and further wherein said second set of a plurality of fuel nozzles is supplied to deliver the remaining 30–70% of said combustion fuel to said site of secondary combustion.

* * * * *

UNITED STATES PATENT AND TRADEMARK OFFICE
CERTIFICATE OF CORRECTION

PATENT NO. : 5,368,472           Page 1 of 2
DATED : November 29, 1994
INVENTOR(S) : James E. Hovis and Harry P. Finke It is certified that error appears in the above-indentified patent and that said Letters Patent is hereby corrected as shown below:

Title page, item [75], Inventors, "Allegheny County" should read --Pittsburgh--.

Title page, item [60], Related U.S. Application Data, "May 16, 1988" should read --March 16, 1988--.

Title page, after [73] Assignee information, insert --[*] Notice: The portion of the term of this patent subsequent to January 19, 2010 has been disclaimed.--.

Column 1 Line 9 "16,1988" should read --16, 1988--.

Column 1 Line 14 "effluents," should read --effluents.--.

Column 4 Line 45 "the-jets" should read --the jets--.

Column 5 Line 53 "for-use" should read --for use--.

Column 7 Line 12 after "reference." insert --Application Serial No. 025,365 was abandoned in favor of continuation application Serial No. 237,645 which is now U.S. Patent No. 4,800,866.--.

UNITED STATES PATENT AND TRADEMARK OFFICE
CERTIFICATE OF CORRECTION

PATENT NO. : 5,368,472
DATED : November 29, 1994
INVENTOR(S) : James E. Hovis and Harry P. Finke It is certified that error appears in the above-indentified patent and that said Letters Patent is hereby corrected as shown below:

Claim 4 Line 61 Column 8 "chamber:" should read --chamber;--.

Claim 5 Line 11 Column 9 "Chamber" should read --chamber--.

Claim 5 Line 19 Column 9 "blower:" should read --blower;--.

Signed and Sealed this

Fourteenth Day of March, 1995

Attest:

BRUCE LEHMAN

Attesting Officer    Commissioner of Patents and Trademarks